3,308,016
NEW ORGANO-PHOSPHORUS COMPOUNDS AND THE INSECTICIDAL COMPOSITIONS CONTAINING THE SAME
Saichiro Kuramoto and Yoshihiko Nishizawa, Toyonaka-shi, Hideo Sakamoto, Itami-shi, and Toshio Mizutani, Minoo-shi, Japan, assignors to Sumitomo Chemical Company, Ltd., Osaka, Japan, a corporation of Japan
No Drawing. Filed July 11, 1961, Ser. No. 123,101
Claims priority, application Japan, July 20, 1960, 35/32,259
9 Claims. (Cl. 167—30)

The present invention relates to new organophosphorus compounds and to the insecticidal compositions containing the same. More particularly, the invention relates to O-(lower alkyl)-O-(4-cyanophenly) thionobenzenephosphonate compounds of the general formula,

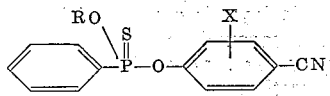

wherein R is a lower alkyl radical and X is a member selected from the group consisting of hydrogen and lower alkyl radicals, and to the low toxic insecticidal compositions containing the said compound as the essential active ingredient. Further, the present invention relates to the method for producing the above mentioned compounds comprising condensing and O-(lower alkyl) chlorothionobenzenephosphonate of the general formula,

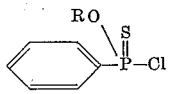

wherein R is a lower alkyl radical, with a cyanophenol compound having the general formula,

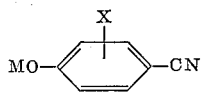

wherein M is a member selected from the group consisting of hydrogen and alkali metals, and X is a member selected from the group consisting of hydrogen and lower alkyl radicals. This compounds of the invention is exceedingly useful for killing agricultural injurious insects, especially borers of rice, for example, rice stem borer (*Chilo suppressalis* Walker), paddy borer (*Schoenobius incertellus* Walker), purplish stem borer (*Sesamia inferens* Walker), and others (such as *Chilo plejadellus* Zinck, *Chilotrea polychrysa* Meyr., *Scirpophaga alibinella* Cramer, *Scirpophaga innotata* Walker, *Eldana dichromellus* Walker, and *Elasmopalpus lignosellus* Zeller), and sanitary injurious insects, especially house fly (*Musca domestica* Linne), and its larva, and the like.

Accordingly, an object of the present invention is to provide new organophosphorus compounds which are very useful as essential active ingredients of pesticidal composition and further have a characteristic of low order of toxicity and long residual effect. Another object of the invention is to provide insecticidal compositions suitable for agricultural and sanitary uses which have an extremely lower order of toxicity towards warm blooded animals, but has a very high degree of insecticidal activity, compared with that of the conventional insecticides. Other objects and advantages will be apparent from the description hereunder stated.

It has been well known that organo-phosphoric acid esters having 4-nitrophenyl radical therein, for example, parathion and methyl parathion, possess a high degree of insecticidal activity and consequently are very useful as the active ingredient of agricultural chemicals. However, they have, at the same time, a very high degree of toxicity towards warm blooded animals and this is, indeed, the weak point of these compounds. Therefore, many attempts have been made to search the compound having lower toxicity and higher insecticidal activity by the American and the German researchers and compounds such as Chlorthion (Farbenfabriken Bayer A.G.) and Dicapthon (American Cyanamid Co.) have been found as the results of their efforts. However, those so-called low toxic insecticidal compounds have really a certain degree of low toxicity, and so they cannot but be inferior to some extents in their insecticidal activities.

A phosphonate compound, EPN (E. I. du Pont de Nemours and Co.), has also been found. But this is not so much satisfactory in its toxicity, though this has somewhat lower toxicity than that of parathion.

The present inventors have made various studies for the purpose of obtaining the compounds which had a low toxicity, a long residual effect, and also a high degree of insecticidal activity, such compound being anxiously desired in rice producing districts. As the results, the inventors have succeeded in obtaining the present compounds which have not only the extremely low toxicity but also the superior activity towards insects, compared with that of any conventional insecticidal compounds.

The organophosphorus compounds according to the present invention, having the general formula,

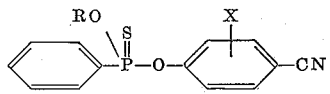

wherein R and X have the same meanings as above-identified, are new compounds unknown in any of preceding literatures. In order to produce the compounds according to the invention, an O-(lower alkyl) chlorothionobenzenephosphonate of the general formula,

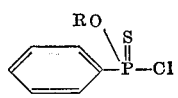

wherein R has the same meaning as above-identified, is condensed with a cyanophenol compound having the general formula,

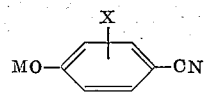

wherein M and X have the same meaning as above-identified.

The O-(lower alkyl) chlorothionobenzenephosphonates of the following formula, employed in the process of the invention,

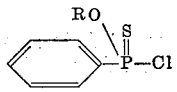

wherein R is a lower alkyl radical, may be prepared according to the known processes, for example according to the process disclosed in U.S. Patent 2,503,390. The R radical in the above-identified formula may be methyl, ethyl n-propyl, isopropyl, and butyl (including the normal, iso, sec.-, and other isomers).

Typical compounds which fall within this range of definition include O-methyl chlorothionobenzenephosphonate ($n_D^{31}$ 1.5842), O-ethyl chlorothionobenzenephosphonate (B.P. 100–101° C./0.28 mm. Hg), O-n-propyl chlorothionobenzenephosphonate (B.P. 96–97° C./0.25 mm. Hg, $n_D^{25}$ 1.5650), and O-n-butyl chlorothionobenzenephosphonate (B.P. 110–113° C./0.2 mm. Hg, $n_D^{27}$ 1.5450).

The cyanophenol compounds employed in the process of the invention and having the general formula,

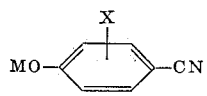

wherein M is a member selected from the group consisting of hydrogen and alkali metals, and X is a lower alkyl radical, may be prepared from phenol compounds containing an amino radical through diazotization and Sandmeyer's reaction according to the known procedure. The typical compounds which fall within this range of definition include 4-cyanophenol (M.P. 110° C.), 2-methyl-4-cyanophenol (M.P. 93° C.), and 3-methyl-4-cyanophenol (M.P. 136° C.). Besides, other cyanophenol compounds which have another lower alkyl radical in the phenol nucleus, namely, ethyl, n-propyl, isopropyl, and butyl (including the normal, iso, sec.-, and other isomers), may be employed. These phenols may be converted to the alkali salts, for example, by contacting with a caustic alkali, metallic alkali, alkali metal alcoholate, and the like, in water or an organic solvent. The alkali may be sodium, potassium, or others.

In the method of this invention, the condensation reaction of these raw materials may successfully be carried out by mixing the both parties at the ratio of at least equal molecular weights, or if possible, with excess of the O-(lower alkyl) chlorothionobenzenephosphonate. In this case, it is preferable to carry out the reaction in an inert organic solvent by use of almost equimolar quantities of the said two compounds in general. For example, when O-(lower alkyl) chlorothionobenzenephosphonate is mixed with an alkali metal cyanophenolate in an inert organic solvent and then heated, a de-alkali metal chloride reaction takes place and the compound of this invention can be produced as the result. When free 4-cyanophenol is utilized in place of the said alkali metal 4-cyanophenolate, the present reaction proceeds according to the so-called de-hydrogen chloride reaction, and in such case, the said reaction may preferably be carried out in the presence of a well-known deacidic agent, for example, such organic bases as pyridine and diethylamine; alkali metal carbonates and alkali metal bicarbonates. The inert organic solvent utilized in the present reaction may include any kind of well-known solvent, provided that it does not affect the present reaction, for example hydrocarbon solvents, halogenated hydrocarbon solvents, alcohols, ketones and ethers. Though the present reaction may proceed only by standing the reaction mixture at the room temperature for long periods of time, it is in general preferable to heat the mixture, for example at a certain temperature lower than the boiling point of the said solvent. Furthermore, the present reaction is preferably carried out in the presence of catalyst such as copper powder and cuprous salts, in good yield.

When the reaction is over, the precipitated alkali metal chloride or hydrochloric acid salt of organic base is filtered off, or alternatively, adequate quantities of water is added to the reaction mixture to dissolve the by-produced salts and water layer is separated off, and then the organic layer is evaporated in vacuo to obtain the objective compound as a residue. By the above-mentioned procedure, a sufficiently purified compound for most of practical use may be obtained, but, if necessary, thus obtained compound may be further purified.

Although the process of the invention was disclosed above with respect to 4-cyanophenol and its alkali salt, it will be understood that any of lower alkyl-substituted 4-cyanophenols and their alkali salts may be employed with the similar reaction conditions.

The efficacy of a typical compound of the invention, O-ethyl-O-(4 - cyanophenyl) thionobenzenephosphonate (M.P. 93–96° C.), will be shown below.

Table 1 sets forth the efficacy of the compound to larvae of rice stem borers by topical application, compared with those of parathion and EPN.

TABLE 1

|  | Hibernating larvae of rice stem borer, topical method [1] (Percent Kill) | | | |
|---|---|---|---|---|
|  | 6.7γ/larva | 2γ/larva | 0.67γ/larva | 0.2γ/larva |
| Ethyl-(4-cyanophenyl) thionobenzenephosphonate | 100 | 100 | 60 | 40 |
| EPN | 100 | 100 | 60 | 40 |
| Parathion | 100 | 100 | 100 | 50 |

[1] See footnote at end of Table 4.

Table 2 sets forth the toxicity ($LD_{50}$ value) towards mouse, of the compound, compared with that of EPN and parathion.

TABLE 2

| Route | The compound | Parathion | EPN |
|---|---|---|---|
| Oral administration (mg./kg.) | 46.0 | 5.8 | 12.2 |
| Subcutaneous administration (mg./kg.) | 145 | 14.2 | 22.5 |
| Intraperitoneal administration (mg./kg.) | 46 | 5.3 | 9.9 |
| Dermal application (mg./mouse) | >15.0 | 0.48 | 8.7 |

Table 3 sets forth the insecticidal activities of the compound to other agricultural pests.

TABLE 3

| Pest | Crop | Formulation | Concentration of the actual ingredient (g./cc.) | Type of application | Effect |
|---|---|---|---|---|---|
| Spider mite | Soy bean | 25.E | 1/2,000 | Spray | 95% kill. |
| Chrysanthemum aphid | Chrysanthemum | 25.E | 1/2,000 | do | Do. |
| Peach green aphid | Radish | 25.E | 1/2,000 | do | Do. |
| Common cabbage worm | Cabbage | 25.E | 1/1,000 | Foliage spray | Do. |
| House fly (adult) |  | 25.E | 1/1,000 | Spray to generative place. | Do. |

NOTE.—Formulation of the emulsifiable concentration in the Table 3 is as follows: O-ethyl-O-(4-cyanophenyl) thionolbenzenephosphonate, 25 parts; Benzene, 50 parts; Triton X-100, 25 parts.

Table 4 further sets forth the efficacies, toxicities and chemical constants, of the other compounds according to the invention.

There is added 18.7 g. (0.1 mol) of O-methyl chlorothionobenzenephosphonate at approximately 30° C. dropwise.

TABLE 4

| Compound | Refractive index | Hibernating larvae of rice stem borer, topical method [1] | | | | Azuki bean weevils, dipping, $LC_{50}$ (p.p.m.) [2] | Spray (Kill percent) | | Oral toxicity towards mouse, $LD_{50}$ (mg./kg.) |
|---|---|---|---|---|---|---|---|---|---|
| | | 20 γ/ larva | 6.7 γ/ larva | 2 γ/ larva | 0.67 γ/ larva | | Spider mite ×2,000, | Aphid ×4,000, | |
| $CH_3O$–P(=S)–O–⟨⟩–CN | $n_D^{29}$ 1.5884 | 100 | 100 | 100 | 100 | 19.3 | 91.7 | 71.8 | 8.5 |
| $n$-$C_3H_7O$–P(=S)–O–⟨⟩–CN | $n_D^{30}$ 1.5886 | 40 | 20 | 0 | 0 | 1,850 | 53.8 | 72.8 | 150 |
| $CH_3O$–P(=S)–O–⟨$CH_3$⟩–CN | $n_D^{32}$ 1.588 | 100 | 100 | 100 | 60 | 154 | 97.6 | 62.5 | 5 |
| $C_2H_5O$–P(=S)–O–⟨$CH_3$⟩–CN | $n_D^{30.5}$ 1.5802 | 50 | 40 | 30 | 20 | 666 | 100.0 | 16.1 | 21.3 |
| $C_2H_5O$–P(=S)–O–⟨$CH_3$⟩–CN | $n_D^{31}$ 1.5813 | 30 | 10 | 0 | 0 | 5,000 | 30.3 | 15.0 | 37 |

[1] Topical test was conducted by using hibernating larvae of rice stem borer as follows. Each compound was dissolved into acetone to prepare a series of acetone solutions containing from 0.067 to 2% of the said compound (g./cc.). Each 1/1000 cc. of the said solution was applied to the body of the larva by means of micrometer syringe and, after keeping it for 3 days at 25° C., its depth or survival condition was observed. The larvae used in this test had almost the same body weights ranging from 80 to 90 mg. and each solution was applied to a group of these 20 larvae in order to calculate the mean fatal percent.

[2] The dipping test was conducted by using Azuki bean weevils as follows. That is, emulsifiable concentrate having the same composition with that of the aforesaid test (see Table 3) was prepared on each compound and the concentrate was diluted with water to obtain various concentrations of the test emulsions (ca. 1/100–1/100,000). To these emulsions, each group of 30 weevils was dipped for 1 minute and then transferred to a Petri dish having a sheet of filter paper at the bottom. After standing overnight at 25° C., the dead and the survival numbers of the weevils were counted. This experiment was triplicated and $LC_{50}$ value was calculated based upon the concentration utilized and the kill percent, on each compound.

The present invention will be illustrated by the following examples, without, however, being limited thereto. Unless otherwise provided, all parts are represented by weights.

*Example 1*

A mixture of 11.9 g. (0.1 mol) of 4-cyanophenol, 7.2 g., of potassium carbonate in methyl isobutyl ketone is heated to about 120° C., whereby the generating carbon dioxide and an azeotropic mixture of water and a part of methyl isobutyl ketone are removed therefrom, to leave a suspension of potassium 4-cyanophenolate. Twenty grams (0.1 mol) of O-ethyl chlorothionobenzenephosphonate is added dropwise to the suspension at approximately 30° C., and, thereafter, heated to 80° C. for 4 hours. After cooling, the organic solvent layer is washed with water, with an aqueous sodium carbonate solution, and again with water, followed by drying on anhydrous sodium sulfate.

The methyl isobutyl ketone solvent is distilled off in vacuo, to leave a light brown oily substance which weighs 25.3 g.

The oily substance is dissolved in toluene, and the solution is subjected to an active alumina-column chromatography. The purified O-ethyl-O-(4-cyanophenyl) thionobenzenephosphonate is a pale yellow oil, which crystallizes on standing, M.P. 93–96° C.

*Analysis.*—Calculated (for $C_{15}H_{14}O_2NPS$): P, 10.2; S, 10.6; N, 4.62%. Found: P, 10.5; S, 10.1; N, 4.85%.

*Example 2*

A suspension of 13.1 g. (0.1 mol) of sodium 4-cyanophenolate in toluene is heated for a while to above 100° C. to remove the adsorbed water through azeotropic distillation, and is added wih 0.1 g. of copper powder.

The reaction mixture is treated as in Example 1, yielding 19.8 g. of the crude ester. The O-methyl-O-(4-cyanophenyl) thionobenzenephosphonate purified by means of an active alumina-column chromatography has the following analytical values.

*Analysis.*—Calculated (for $C_{14}H_{12}NO_2PS$): P, 10.7; S, 11.1; N,4.84%. Found: P, 11.0; S, 10.5; N, 4.99%.

*Example 3*

There are added 13.3 g. (0.1 mol) of 4-cyano-2-methylphenol, 20.0 g. of O-ethyl-chlorothionobenzenephosphonate, and 0.1 g. of cuprous chloride to chlorobenzene, and the mixture is heated to 80° C. and added with 7.2 g. of anhydrous potassium carbonate portionwise. The temperature rises to 100° C. The mixture is heated for additional 4 hours at that temperature with stirring, cooled to room temperature, added with water, and filtered. The filtrate is separated in two layers, and the chlorobenzene layer is washed with an aqueous potassium carbonate, and then with water, and dried on anhydrous sodium sulfate. The removal of the chlorobenzene leaves a light brown oil, weighing 28.6 g., which is purified as in Example 2 to yield pale yellow O-ethyl-O-(4-cyano-2-methylphenyl) thionobenzenephosphonate.

*Analysis.*—Calculated (for $C_{16}H_{16}NO_2PS$): P, 9.8; S, 10.1; N, 4.41%. Found: P, 10.4; S, 10.0; N, 4.80%.

*Example 4*

The procedure as set forth in Example 1 is repeated, using 13.3 g. (0.1 mol) of 3-methyl-4-cyanophenol and 20.0 g. (0.1 mol) of O-ethyl chlorothionobenzenephosphonate. A crude O-ethyl-O-(3-methyl-4-cyanophenyl) thionobenzenephosphonate is obtained in the yield of 29.9 g. The purified ester shows the following analytical values.

*Analysis.*—Calculated (for $C_{16}H_{16}NO_2PS$): P, 9.8; S, 10.1; N, 4.41%. Found: P, 9.7; S, 10:5; N, 4.88%.

Similarly, other O-(lower alkyl)-O-(4-cyanophenyl) thionobenzenephosphonate compounds, for example, these shown in Table 4, can be obtained by use of the corresponding materials.

*Example 5*

Twenty-five parts of O-methyl-O-(4-cyanophenyl) thionobenzenephosphonate was combined with 25 parts of Triton X–100 (a polyethylene glycol nonylphenyl ether, made by Rohm & Haas Co., U.S.A.) and 50 parts of benzene in the described order to make a uniform emulsifiable concentrate. The rice plants after 20 days from their sowing were transplanted into the Wagner-pot having a surface area of $1/50{,}000$ of 10 ares, each four plants a pot. After 2 months, these plants were infested with rice stem borers and, 3 days later from the encroachment of the pests, 10 cc. of $1/500$ diluted emulsion of the said 25% emulsifiable concentrate was sprayed per pot. Almost 100% of the borers encroaching in the stems were killed in 3 days.

*Example 6*

Twenty-five parts of O-methyl-O-(4-cyano-3-methylphenyl) thionobenzenephosphonate was combined with 25 parts of Triton X–100 and 50 parts of xylene in the described order to make a uniform emulsifiable concentrate, which shows the same degree of insecticidal effects according to the same test as in Example 5.

*Example 7*

Twenty-five parts of O-ethyl-O-(4-cyano-2-methylphenyl) thionobenzenephosphonate was combined with 25 parts of Triton X–100 and 50 parts of xylene in the described order to make a uniform emulsifiable concentrate, which shows about 90% kill of rice stem borers according to the same test as in Example 5.

*Example 8*

Five parts of O-ethyl-O-(3-methyl-4-cyanophenyl) thionobenzenephosphonate was dissolved into 20 parts of acetone and the acetone solution was thoroughly admixed with 95 parts of 200 mesh talc. Evaporation of the solvent gave 5% dust formulation.

When 50 to 100 g. of the dust per a square meter was sprayed to a favorite haunt of flies, almost 100% of the fly maggots growing within said place were killed.

We claim:

1. An O-(lower alkyl)-O-(4-cyanophenyl) thionobenzenephosphonate compound having the formula,

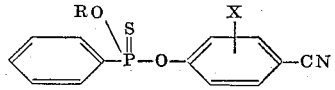

wherein R is lower alkyl and X is a member selected from the group consisting of hydrogen and lower alkyl.

2. A compound according to the claim 1, wherein R is selected from the group consisting of methyl and ethyl and X is a member selected from the group consisting of hydrogen and methyl.

3. O - methyl - O-(4-cyanophenyl) thionobenzenephosphonate.

4. O-ethyl-O-(4-cyanophenyl) thionobenzenephosphonate.

5. An insecticidal composition comprising an inert carrier and, as the essential active ingredient, an O-(lower alkyl) - O - (4 - cyanophenyl) thionobenzenephosphonate compound having the formula,

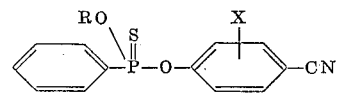

wherein R is a lower alkyl and X is a member selected from the group consisting of hydrogen and lower alkyl.

6. An insecticidal composition comprising an inert carrier and, as the essential active ingredient, O-methyl-O-(4-cyanophenyl) thionobenzenephosphonate.

7. An insecticidal composition comprising an inert carrier and, as the essential active ingredient, O-ethyl-O-(4-cyanophenyl) thionobenzenephosphonate.

8. The method of destroying insects which comprises contacting the insects with a toxic amount of a cyanoaryl phosphonothioate of the structure

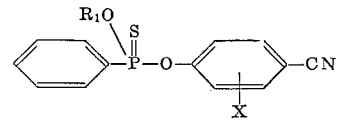

wherein $R_1$ is lower alkyl and X is a member selected from the group consisting of hydrogen and methyl.

9. An O-(4-cyanophenyl) phenylphosphonothioate of the formula

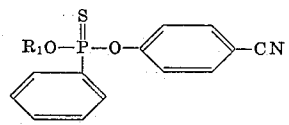

wherein $R_1$ is lower alkyl.

References Cited by the Examiner

UNITED STATES PATENTS

| | | | |
|---|---|---|---|
| 2,503,390 | 4/1950 | Jelinek | 260—461.110 |
| 2,784,207 | 3/1957 | Geoghegan et al. | 260—461.112 |
| 2,910,402 | 10/1959 | Fairchild | 260—461.110 |

OTHER REFERENCES

Schrader: "Die Entwicklung Never Insektizide Auf Grundlage Organishcher Fluorund Phosphor-Verbindungen," Verlag Chemie, G.m.b.H. (1952), pp. 56–59.

ALBERT T. MEYERS, *Primary Examiner.*

MORRIS LIEBMAN, MORRIS O. WOLK, *Examiners.*

FRANK M. SKORA, JULIAN S. LEVITT, GEORGE A. MENTIS, *Assistant Examiners.*